US 10,153,709 B2

(12) United States Patent
Nagel et al.

(10) Patent No.: US 10,153,709 B2
(45) Date of Patent: Dec. 11, 2018

(54) CONVERTER ARRANGEMENT COMPRISING MOVABLE CONTACTS, BUT IMMOVABLE CONVERTER ASSEMBLY

(71) Applicant: SIEMENS AKTIENGESELLSCHAFT, München (DE)

(72) Inventors: Andreas Nagel, Nürnberg (DE); Harald Ponath, Hirschaid (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/544,802

(22) PCT Filed: Dec. 9, 2015

(86) PCT No.: PCT/EP2015/079045
§ 371 (c)(1),
(2) Date: Jul. 19, 2017

(87) PCT Pub. No.: WO2016/116213
PCT Pub. Date: Jul. 28, 2016

(65) Prior Publication Data
US 2017/0366097 A1 Dec. 21, 2017

(30) Foreign Application Priority Data
Jan. 20, 2015 (EP) .................................. 15151795

(51) Int. Cl.
H02P 3/00 (2006.01)
H02M 7/00 (2006.01)
(Continued)

(52) U.S. Cl.
CPC ............. *H02M 7/003* (2013.01); *B60R 16/03* (2013.01); *H02J 4/00* (2013.01); *H02P 27/04* (2013.01); *H01H 31/32* (2013.01)

(58) Field of Classification Search
CPC ........... H02M 7/003; H02P 27/04; H02J 4/00; B60R 16/03
(Continued)

(56) References Cited

U.S. PATENT DOCUMENTS 5,712,779 A * 1/1998 Sheppard .............. H04M 19/00
361/614
8,432,694 B2 4/2013 Hentschel et al.
(Continued)

FOREIGN PATENT DOCUMENTS

| CN | 101855695 A | 10/2010 |
|----|----|----|
| EP | 2387141 A1 | 11/2011 |
| EP | 2544203 A1 | 1/2013 |

Primary Examiner — Eduardo Colon Santana
Assistant Examiner — Gabriel Agared
(74) Attorney, Agent, or Firm — Henry M. Felereisen LLC

(57) ABSTRACT

A converter arrangement includes a basic structure having a receptacle, a first electrical network including lines arranged on the basic structure, a plurality of first contacts arranged on the basic structure and movable via a first actuator from a first connection position into a first release position, and a converter assembly securable in the first release position as a unit in a fixed location in the receptacle of the basic structure and removable from the receptacle. The converter assembly is electrically connected to the lines of the first electrical network when the first contacts assume the first connection position, and electrically disconnected from the lines of the first network when the first contacts assume the first release position. The receptacle of the basic structure is immobile when the first contacts move from the first connection position into the first release position.

24 Claims, 4 Drawing Sheets

(51) Int. Cl.
  *B60R 16/03* (2006.01)
  *H02J 4/00* (2006.01)
  *H02P 27/04* (2016.01)
  *H01H 31/32* (2006.01)
(58) Field of Classification Search
  USPC .......................................................... 318/494
  See application file for complete search history.

(56) References Cited

U.S. PATENT DOCUMENTS

| | | |
|---|---|---|
| 8,599,556 B2 | 12/2013 | Hentschel et al. |
| 2008/0079314 A1 | 4/2008 | Hammond |
| 2008/0266915 A1* | 10/2008 | Eckardt ................ H02M 5/458 363/65 |
| 2011/0204712 A1* | 8/2011 | Tarasinski .............. A01B 59/06 307/9.1 |
| 2011/0316333 A1* | 12/2011 | Still ........................ B60L 1/003 307/9.1 |
| 2012/0146592 A1 | 6/2012 | Ackermann et al. |
| 2013/0162031 A1* | 6/2013 | Galek ................. B60L 11/1803 307/10.1 |
| 2013/0255802 A1* | 10/2013 | Minnock ............... E21B 34/045 137/554 |
| 2014/0146486 A1 | 5/2014 | Hammond |
| 2014/0146496 A1 | 5/2014 | Cao et al. |

* cited by examiner

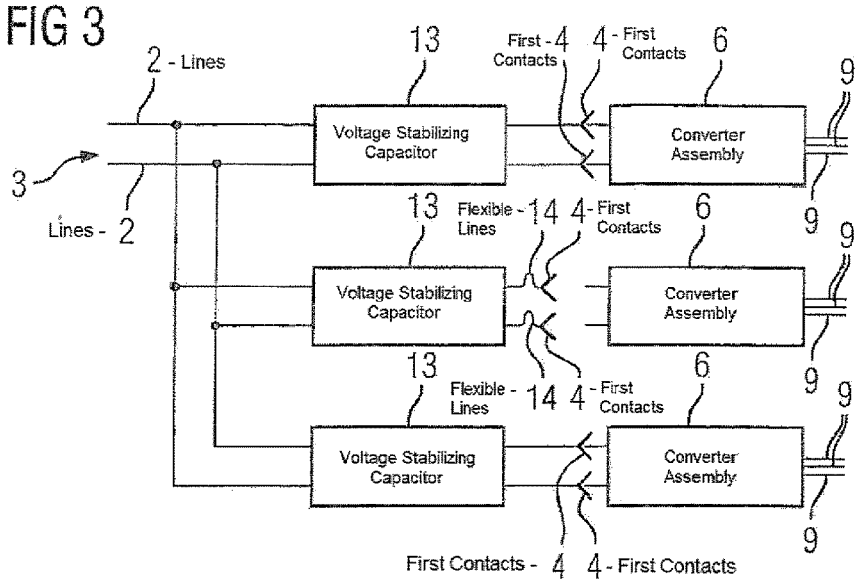
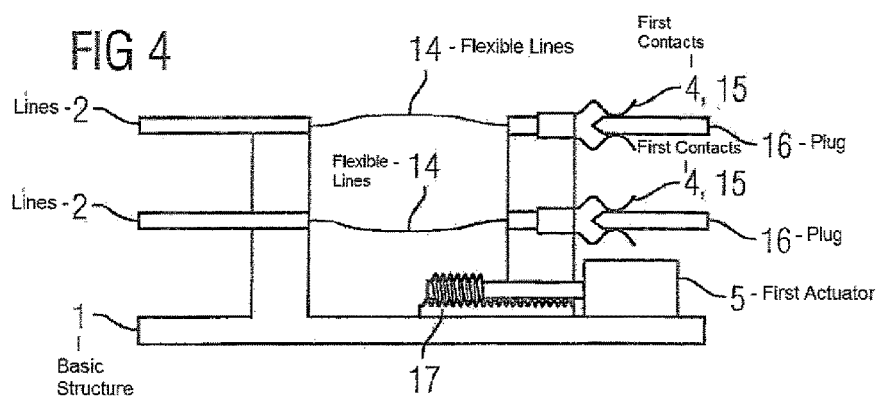
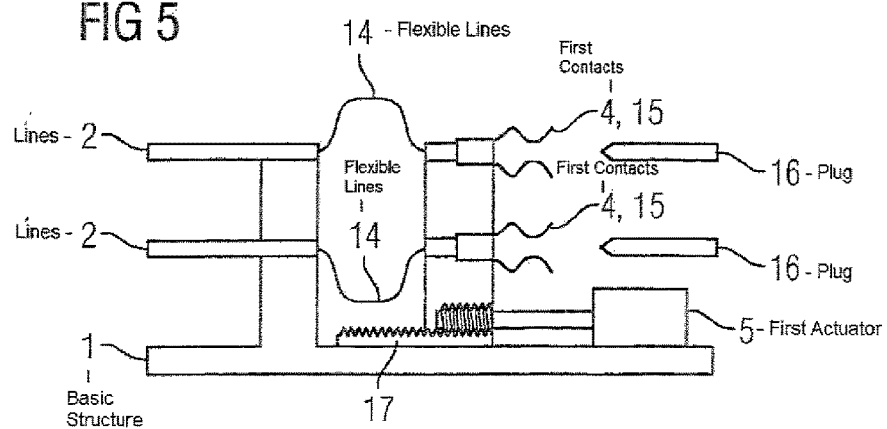

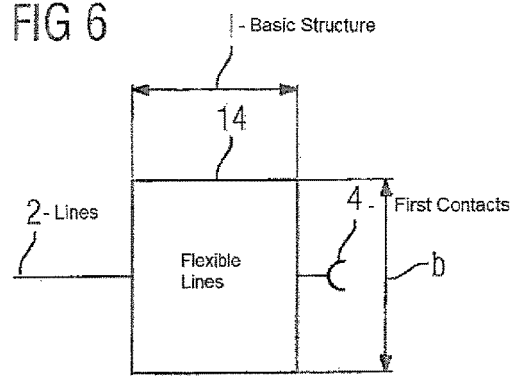
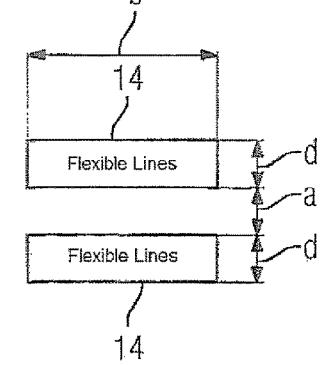
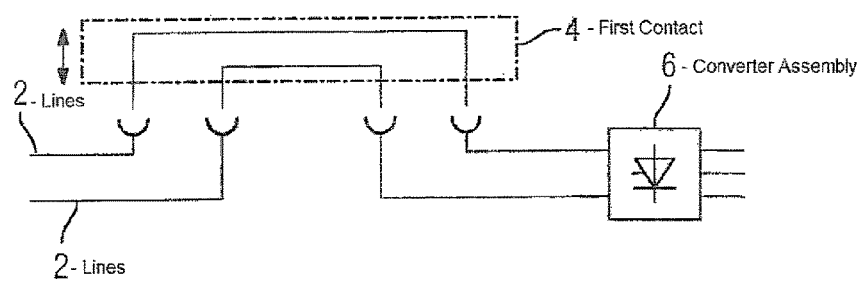
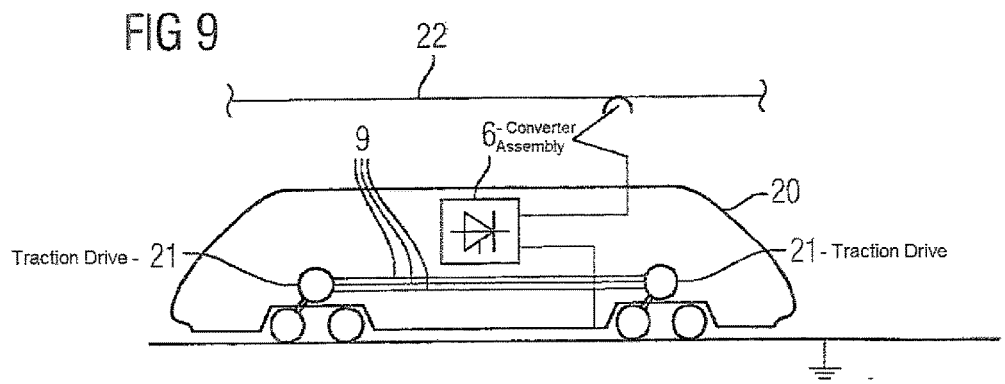

CONVERTER ARRANGEMENT COMPRISING MOVABLE CONTACTS, BUT IMMOVABLE CONVERTER ASSEMBLY

CROSS-REFERENCES TO RELATED APPLICATIONS

This application is the U.S. National Stage of International Application No. PCT/EP2015/079045, filed Dec. 9, 2015, which designated the United States and has been published as International Publication No. WO 2016/116213 A1 which claims the priority of European Patent Application, Serial No. 15151795.0, filed Jan. 20, 2015, pursuant to 35 U.S.C. 119(a)-(d).

BACKGROUND OF THE INVENTION

The present invention is based on a converter arrangement,
wherein the converter arrangement has a basic structure,
wherein lines of a first electrical network are arranged on the basic structure.

High-power converters are frequently constructed in a redundant arrangement for reasons of availability. This is also—but not only—true for example in the railroad field. In the case of a redundant structure the converter system consists of a number of individual converter assemblies.

In the event of a malfunction of an individual converter assembly the faulty assembly must at least be disconnected from lines of the first network. An isolation switch is usually used for this purpose in the prior art.

To enable converter assemblies to be released individually from the converter system the individual converter assemblies are further often connected to the lines of the first network via plug-in connections. The plug-in connections will however not be used as a rule as isolating switches for disconnection in the event of a malfunction. However this method of operation is also known from EP 2 387 141 A1. In EP 2 387 141 A1, in the event of a malfunction of a converter assembly, the respective converter assembly will be moved in its entirety by means of an actuator and thereby disconnected from the lines of the first network. During disconnection of the respective converter assembly from the lines of the first network the plug-in connections in particular will be released.

The solution of EP 2 387 141 A1 represents progress compared to the conventional prior art, since in EP 2 387 141 A1 the plug-in connection present in any event will be used for disconnecting the converter assembly from the lines of the first network. This means that independent isolation switches, which are present in the prior art in addition to the plug-in connections, become unnecessary.

The solution of EP 2 387 141 A1 is disadvantageous however because the entire mass of the converter assembly must be moved. Furthermore the converter assembly must be mechanically fixed both in the first connection position and also in the first release position. This is especially disadvantageous if the basic structure, and with it the converter assembly, is subjected to mechanical shock and shaking stresses and/or vibrations.

SUMMARY OF THE INVENTION

The object of the present invention consists of creating options by means of which, in a simple, efficient, reliable and cost-effective manner, an electrical disconnection of the converter assembly from the lines of the first network can be achieved.

According to one aspect of the invention, the object is achieved by a converter arrangement which includes
- a basic structure having arranged thereon a plurality of first contacts, which are able to be transferred by means of a first actuator at least from a first connection position into a first release position,
- a converter assembly as a unit, in the first release position, being able to be fastened into a receptacle of the basic structure and being able to be removed from the receptacle,
- the converter assembly, where it is fastened in the receptacle of the basic structure, being arranged in a fixed location in the receptacle and being electrically connected to the first network, when and for as long as the first contacts are located in the first connection position, and being electrically disconnected from the lines of the first network when and for as long as the first contacts are located in the first release position, and
- the receptacle not being moved when the first contacts are transferred from the first connection position into the first release position.

Advantageous embodiments of the inventive converter arrangement are the subject matter of the dependent claims.

According to another aspect of the invention, a vehicle includes a converter arrangement as set forth above, with the converter arrangement being connected via a second network to a traction drive of the vehicle.

Through this embodiment, for disconnection of the converter assembly from the lines of the first network, it is merely still necessary to transfer the first contacts from the first connection position into the first release position. A movement of other parts—in particular of the heavy converter assembly—is not necessary.

Preferably the first network is a DC voltage network. In this case the DC voltage network generally has a voltage stabilizing capacitor. Within the framework of the present invention the voltage stabilizing capacitor can in particular be arranged at a fixed location on the basic structure.

In a preferred embodiment the first contacts are connected to the lines of the first network via flexible lines. This solution is able to be realized in an especially simple and low-cost manner.

The flexible lines can be embodied as strip lines that, viewed from the lines of the first network to the first contacts, have a length, viewed in cross section have a width and a thickness and are spaced at a distance from one another. Preferably the length is as short as possible, the width is as large as possible and the distance is as short as possible. In particular it should preferably be true to say that the width is significantly greater than the distance of the lines from one another, especially at least three times as great. Preferably the width is also greater than the length of the lines.

As an alternative to an embodiment as flexible lines, the first contacts can be embodied as contact bridges that, in the first connection position, are electrically connected both to the converter assembly and also to the lines of the first network and, in the first release position, are electrically disconnected both from the converter assembly and also from the lines of the first network.

The first contacts can be embodied in particular as plugs or as receptacles for plugs of electrical plug-in connections. An embodiment as receptacles for plugs of electrical plug-in connections is preferred.

In individual cases it can be possible for the actuator to be activated by an operator. As a rule the converter arrangement has an evaluation device however, by means of which a malfunction of the converter assembly will be detected automatically. In this case the evaluation device is embodied as a control device for the first actuator and is connected to the first actuator for control purposes.

The first actuator can be embodied as required as an electrical, hydraulic or pneumatic actuator.

As a rule the converter assembly is connected to lines of a second electrical network. The lines of the second network can be arranged in particular on the basic structure. In this case, in relation to the second network, there is preferably an embodiment analogous to the embodiment in relation to the first network. In this case there is thus preferably provision
- for a plurality of second contacts to be arranged on the basic structure, which are able to be moved by means of a second actuator at least from a first connection position into a first release position,
- for the converter assembly as a unit to be able to be fastened into a receptacle of the basic structure and to be able to be removed from the receptacle,
- for, provided the converter assembly is fastened in the receptacle of the basic structure, said converter to be electrically connected to the lines of the second network, when and for as long as the second contacts are located in the second connection position, and for it to be electrically disconnected from the lines of the second network when and for as long as the second contacts are located in the second release position, and
- for the receptacle not to be moved when the second contacts are transferred from the second connection position into the second release position.

In individual cases it is possible for the first and the second actuator to be activated independently of each other. Generally however the first and the second actuator will be activated jointly by one control device or are identical to one another.

The second network can especially be a multi-phase alternating current network.

Otherwise the statements made above relating to the first network are also able to be applied in a similar way to the second network.

The inventive converter arrangement is able to be used as a fixed or mobile arrangement, as required. When used as a mobile arrangement in particular, a preferred application of the present invention consists of a vehicle having an inventive converter arrangement and the converter arrangement being connected to a traction drive of the vehicle via a second network.

BRIEF DESCRIPTION OF THE DRAWINGS

The characteristics, features and advantages of this invention described above, as well as the manner in which these will be achieved, will become clearer and easier to understand in conjunction with the following description of the exemplary embodiments, which will be explained in greater detail in conjunction with the drawings. In the drawings, in schematic diagrams:

FIG. 3 shows a schematic of an embodiment of first contacts,

FIG. 4 shows first contacts and a first actuator in a first connection position, FIG. 5 shows the first contacts and the first actuator from FIG. 4 in a first release position, FIG. 6 shows connections of first contacts and lines of a first network, FIG. 7 shows a flexible line in cross-section, FIG. 8 shows first contacts, and FIG. 9 shows a vehicle with a converter arrangement.

DETAILED DESCRIPTION OF THE EMBODIMENTS

Figure 1:
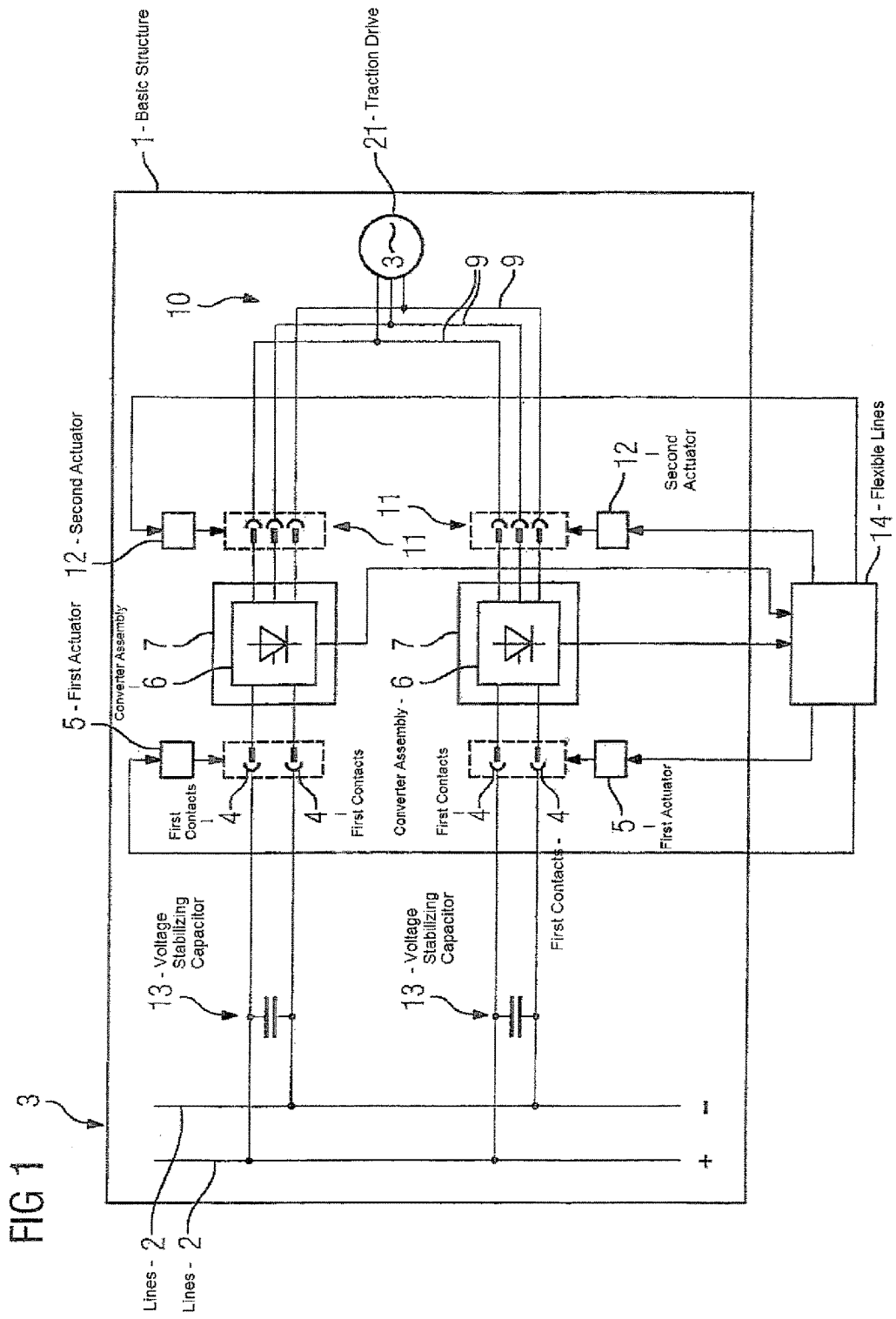
FIG. 1 shows a converter arrangement.
Figure 2:
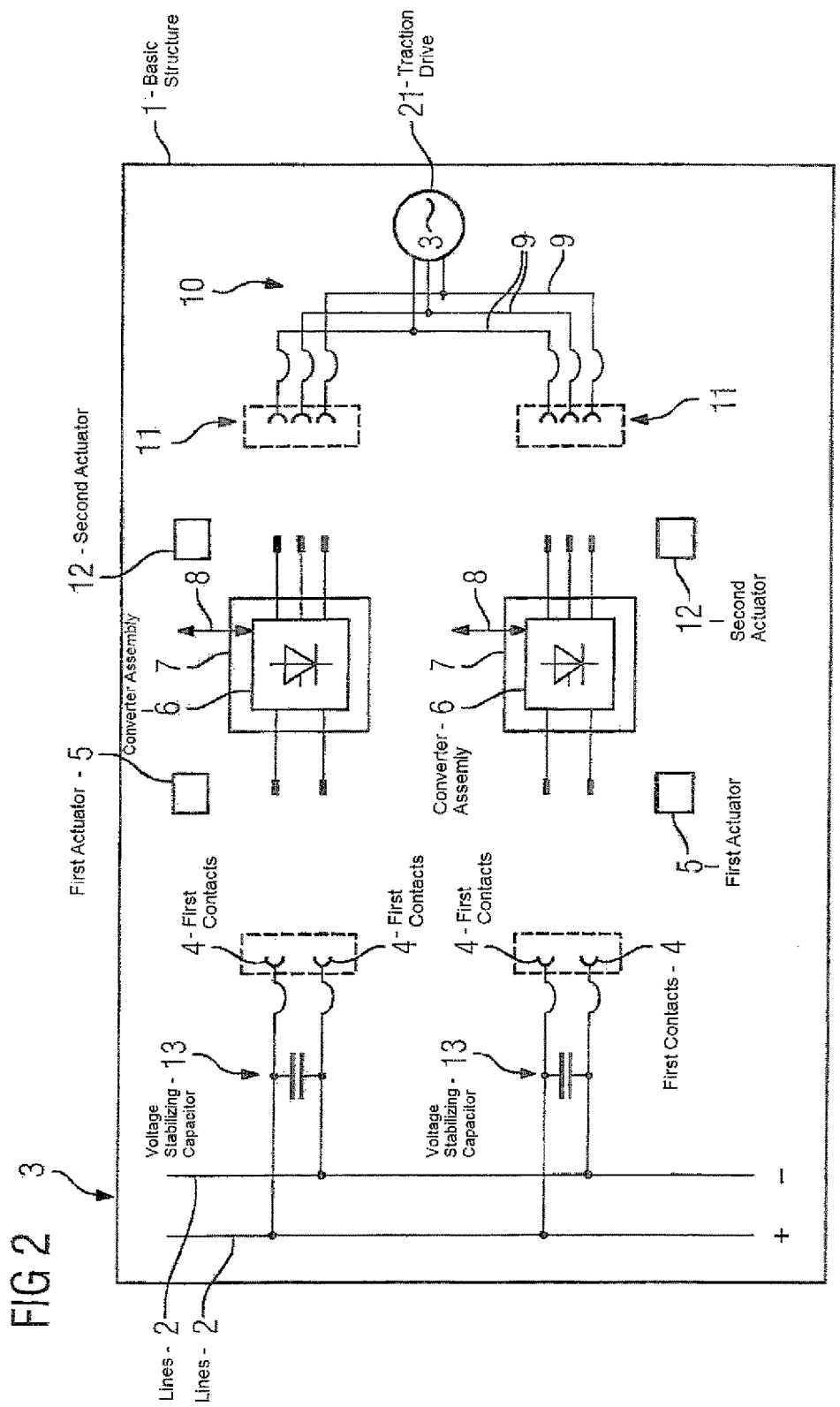
FIG. 2 shows the converter arrangement from FIG. 1 in another state.

In accordance with FIG. 1 and FIG. 2, a converter arrangement has a basic structure 1. Arranged on the basic structure 1 are lines 2 of a first electrical network 3. The first network 3 can in particular be a DC voltage network. The lines 2 of a first network 3 can in particular be arranged in a fixed location on the basic structure 1.

Also arranged on the basic structure 1 is a plurality of first contacts 4. The first contacts 4 are able to be transferred by means of a first actuator 5 from a first connection position into a first release position. FIG. 1 shows the first contacts 4 in the first connection position, FIG. 2 shows them in the first release position.

When the first contacts 4 are located in the first release position, a converter assembly 6 is able to be fastened in a receptacle 7 of the basic structure 1 and is also able to be removed from it again. This is indicated in FIG. 2 by a double-ended arrow 8. The converter assembly 6 is at least embodied as a single phase of a converter with an intermediate voltage circuit. As a rule the converter assembly 6 is embodied as an at least unidirectional B6 bridge. In many cases the converter assembly 6 is even embodied as a bidirectional B6 bridge. The individual converters of the converter assembly 6 can be embodied as required as line-commutated or as self-commutated thyristors or as transistors (for example as IGB transistors). As a rule the individual converters are embodied as semiconductor switches that can be switched on and switched off.

When the first contacts 4 are in the first connection position, under some circumstances the converter assembly 6 can also be able to be fastened in the receptacle 7 and removed from it. As an alternative it is possible for the converter assembly 6 only to be able to be fastened in the receptacle 7 and removed from it exclusively when the first contacts 4 are in the first release position.

When the converter assembly 6 is fastened in the receptacle 7 of the basic structure 1, it is arranged in a fixed location in the receptacle 7. In this case the converter assembly 6 can alternately be connected electrically to the lines 2 of the first network 3 or be disconnected electrically from the lines 2 of the first network 3. In particular the converter assembly 6 is connected electrically to the lines 2 of the first network 3 when and for as long as the first contacts 4 are in the first connection position (see FIG. 1). Conversely the converter assembly 6 is disconnected electrically from the lines 2 of the first network 3 when and for as long as the first contacts 4 are in the first release position (see FIG. 2). As a rule the converter assembly 6 is disconnected in this case from the lines 2 of the first network 3 at all poles. In individual cases however it can be sufficient to undertake only a single-pole disconnection.

By means of the first actuator 5, as already mentioned, the first contacts 4 can at least be transferred from the first connection position into the first release position. Often the first contacts 4 can also be transferred by means of the first actuator 5 in the reverse direction from the first release position into the first connection position. Independent of whether just a unidirectional or a bidirectional movement of the first contacts 4 is possible by the first actuator 5, the receptacle 7 will not be moved relative to the basic structure 1 however on transfer of the first contacts 4 from the first connection position into the first release position (and if necessary also vice versa). Because of the fixed-location arrangement of the converter assembly 6 in the receptacle 7, the converter assembly 6 will thus not be moved in relation to the basic structure 1.

In many cases, in accordance with the depiction in FIGS. 1 and 2, a number of receptacles 7 are present on the basic structure 1, in which a separate converter assembly 6 is able to be fastened in each case. In this case the corresponding statements apply individually for the respective converter assembly 6.

The converter assembly 6 is furthermore able to be connected to lines 9 of a second electrical network 10. The second network 10 can in particular be a multi-phase alternating current network. The lines 9 of the second network 10 can, in accordance with depictions in FIGS. 1 and 2, be arranged on the basic structure. The lines 9 of the second network 10 can, in a similar manner to the lines 2 of the first network 3—in particular be arranged in a fixed location on the basic structure 1.

It is possible for the lines 9 of a second electrical network 10 to be proprietary for the respective converter assembly 6, thus for exclusively the respective converter assembly 6, but for no further converter assembly 6, to be connected to the lines 9 of a second electrical network 10. This embodiment will also often be realized. In this case it is possible that the connection of the converter assembly to the lines 9 of the second electrical network 10 will not be releasable. As an alternative the connection can be releasable. When the connection is releasable a plurality of second contacts 11 can be arranged on the basic structure 1—in addition to the first contacts 4. In this case the second contacts 11—in a similar manner to the first contacts 4—are able to be transferred by means of a second actuator 12 at least from a second connection position into a second release position. FIG. 1 shows the second contacts 11 in the second connection position, FIG. 2 shows them in the second release position.

In a similar way to the first contacts 4, the converter assembly 6 is able to be fastened as a unit in the receptacle 7 of the basic structure 1 and removed from it when the second contacts 11 are located in the second release position (see FIG. 2). In the second connection position a corresponding release capability and connection capability can but does not have to exist. Preferably the same dependency exists in relation to the first contacts 4 and the second contacts 11. Thus, if the converter assembly 6 is able to be removed as a unit from the receptacle 7 even when the first contacts 4 are located in the first connection position, the converter assembly 6 is also able to be removed as a unit from the receptacle 7 when the second contacts 4 are located in the second connection position. If on the other hand the converter assembly 6 is not able to be removed from the receptacle 7 as a unit when the first contacts 4 are located in the first connection position, the converter assembly 6 is preferably not able to be removed as a unit from the receptacle 7 even when the second contacts 11 are located in the second connection position.

In a similar manner to connection with the lines 2 of the first network 3, the converter assembly 6, provided it is fastened in the receptacle 7, can be electrically connected as an alternative to the lines 9 of the second network 10 or can be electrically disconnected from the lines 9 of the second network 10. In particular the converter assembly 6 is electrically connected to the lines 9 of the second network 10 when and for as long as the second contacts 11 are located in the second connection position (see FIG. 1). Conversely the converter assembly 6 is electrically disconnected from the lines 9 of the second network 10 when and for as long as the second contacts 11 are located in the second release position (see FIG. 2). As a rule the converter assembly 6 is disconnected from the lines 9 of the second network 10 at all poles. In individual cases it can also be sufficient however to undertake only a single-pole disconnection.

In a similar manner to the situation in relation to the first contacts 4, the receptacle 7 will not be moved relative to the basic structure 1 on transfer of the second contacts 11 from the second connection position into the second release position (and if necessary also vice versa).

When the first network 3 is embodied as a DC voltage network, in accordance with the depiction in FIGS. 1 and 2—if necessary for each converter assembly 6—it can have at least one voltage stabilizing capacitor 13. In this case the voltage stabilizing capacitor 13 or the voltage stabilizing capacitors 13 are arranged in a fixed location of the basic structure 1. Thus it will not be moved on transfer of the first contacts 4 from the first connection position into the first release position (and if necessary also vice versa).

More details will be provided below about the first contacts 4, their embodiment, their connection options with the lines 2 of the first network 3 and the first actuator 5. The corresponding embodiments are however also possible in a similar way for the second contacts 11, their connection options with the lines 9 of the second network 10 and the second actuator 12.

In accordance with FIGS. 3 to 5 the first contacts 4 are connected to the lines 2 of the first network 3 via flexible lines 14. The first contacts 4 can, in accordance with FIGS. 3 to 5, be embodied in particular as receptacles 15 for plugs 16 of electrical plug-in connections. The reverse embodiment is also possible. The flexible lines 14, seen from the lines 2 of the first network 3 to the first contacts 4, have a length l.

The flexible lines 14 can for example, in accordance with the depictions in FIGS. 6 and 7, be embodied as strip lines. In the event of them being embodied as strip lines, the flexible lines 14 have width b and a thickness d. Furthermore the strip lines have a distance a from one another. The distance a extends—see in particular FIG. 7—in the same direction as the thickness d of the lines 14. A layer of insulation can be arranged between the lines 14. The layer of insulation is not shown in FIGS. 6 and 7 in addition.

Preferably the width b is significantly greater than the distance a of the lines 14 from one another, especially three times as great. For example the width b can be at least five times, ten times or twenty times as great as the distance a of the lines 14 from one another.

Preferably the width b is greater than the length l.

In accordance with FIGS. 4 and 5 the first actuator 5 is embodied as an electrical actuator, in particular as an electric motor, which acts via a spindle drive 17 on the first contacts 4. As an alternative the first actuator 5 could be embodied for example as a hydraulic or pneumatic actuator. The embodiment of the first actuator 5 is independent of the embodiment of the connection of the first contacts 4 to the lines 2 of the first network 3 and is also independent of whether the first contacts 4 are embodied as receptacles 15 for plugs 16, are embodied directly as plugs 16 or are embodied in some other way.

The first contacts 4 also do not have to be connected via flexible lines 14 to the lines 2 of the first network 3. As an alternative to a connection via flexible lines 14, the first contacts 4 can be embodied for example, in accordance with the schematic diagram depicted in FIG. 8, as contact bridges 18. In this case the first contacts 4, in the first connection position, are electrically connected both to, the converter assembly 6 and also to the lines 2 of the first network 3. In the first release position the first contacts 4—of course—are electrically disconnected from the converter assembly 6. In addition the first contacts 4, in the embodiment in accordance with FIG. 8, are however also disconnected electrically from the lines 2 of the first network 3.

As a rule the converter arrangement, as depicted in the diagram in FIG. 1, further has an evaluation device 19. By means of the evaluation device 19—in a manner known per se—a malfunction of the converter assembly 6 will be detected automatically. When a malfunction of the converter assembly 6 is detected, the evaluation device 19 activates the first actuator 5 and if necessary the second actuator 12 for the respective converter assembly 6. The evaluation device 19 is thus embodied as a control device for the first actuator 5 and if necessary also for the second actuator 12. Furthermore it is connected for signaling purposes to the first actuator 5 and if necessary also to the second actuator 12 for transfer of the corresponding control signals.

In many cases, together with the disconnection of a specific converter assembly 6 from the lines 2 of the first network 3, a disconnection of this converter assembly 6 from the lines 9 of the second network 10 is also necessary. In this case the first and the second actuator 5, 12 will be activated jointly—by the evaluation device 19 or generally by a control device. As an alternative to a joint activation, the two actuators 5, 12 can also be identical to one another.

The converter arrangement can be used for any given purposes. For example the converter arrangement, as depicted in the diagram in FIG. 9, can be a component of a vehicle 20, for example an electric automobile, an electrically-driven aircraft, a ship or—as shown in FIG. 9—a rail vehicle.

In the case of a vehicle 20, the converter arrangement is connected via the lines 9 of the second network 10 to a traction drive 21 (see also FIGS. 1 and 2) of the vehicle 20.

The first network 3 can be autonomous or—for example—be supplied with electrical energy via an overhead line 22. If necessary there can be a rectification between the overhead line 22 and the first network 3. For reasons of clarity the basic structure 1, the contacts 4, 11, the actuators 5, 12 and also other elements of the converter arrangement such as the voltage stabilizing capacitors 13 are not shown in addition in FIG. 9. They are present however.

In summary the present invention thus relates to the following subject matter:

A converter arrangement has a basic structure 1 on which lines 2 of a first electrical network 3 are arranged. Also arranged on the basic structure 1 is a plurality of first contacts 4, which are able to be transferred by means of a first actuator 5 at least from a first connection position into a first release position. In the first releases position a converter assembly 6 is able to be fastened as a unit in a receptacle 7 of the basic structure 1 and is able to be removed from the receptacle 7. The converter assembly 6, provided it is fastened in the receptacle 7 of the basic structure 1, is arranged in a fixed location in the receptacle 7. It is electrically connected to the lines 2 of the first network 3 when and for as long as the first contacts 4 are located in the first connection position. It is electrically disconnected from the lines 2 of the first network 3 when and for as long as the first contacts 4 are located in the first release position. The receptacle 7 will not be moved during the transfer of the first contacts 4 from the first connection position into the second release position.

The present invention has many advantages. In particular there can be a reliable disconnection of the converter assembly 6 from the lines 2 of the first network 3 with a low energy outlay and with only small moved masses. In particular as a result of this embodiment the inventive converter arrangement is able to be used under conditions in which the converter arrangement is subjected to vibrations and shock stresses. Furthermore a low-induction connection can be insured between the voltage stabilizing capacitor 13 or the voltage stabilizing capacitors 13 and the converter assembly 6.

Although the invention has been illustrated and described in greater detail by the preferred exemplary embodiment, the invention is not restricted by the disclosed examples and other variations can be derived herefrom by the person skilled in the art, without departing from the scope of protection of the invention.

What is claimed is:

1. A converter arrangement, comprising:
a basic structure having a receptacle;
a first electrical network including lines arranged on the basic structure;
a plurality of first contacts arranged on the basic structure and movable via a first actuator from a first connection position into a first release position; and
a converter assembly securable in the first release position as a unit in a fixed location in the receptacle of the basic structure and removable from the receptacle, said converter assembly being electrically connected to the lines of the first electrical network when the first contacts assume the first connection position, and electrically disconnected from the lines of the first network when the first contacts assume the first release position,
wherein the receptacle of the basic structure is immobile when the first contacts move from the first connection position into the first release position.

2. The converter arrangement of claim 1, wherein the first network is a DC voltage network, said DC voltage network including a voltage stabilizing capacitor arranged in a fixed location on the basic structure.

3. The converter arrangement of claim 1, further comprising flexible lines connecting the first contacts to the lines of the first network.

4. The converter arrangement of claim 3, wherein the flexible lines are embodied as strip lines which, when viewed from the lines of the first network to the first contacts, have a length, a width in cross-section, a thickness, and are spaced from one another at a distance.

5. The converter arrangement of claim 4, wherein the width of the flexible lines is significantly greater than the distance of the flexible lines from one another.

6. The converter arrangement of claim 1, wherein the first contacts are embodied as contact bridges, said contact bridges being electrically connected both to the converter assembly and to the lines of the first network in the first connection position, and electrically disconnected from the converter assembly and from the lines of the first network in the first release position.

7. The converter arrangement of claim 1, wherein the first contacts are embodied as plugs or receptacles for plugs of plug-in electrical connections.

8. The converter arrangement of claim 1, further comprising an evaluation device configured to automatically detect a malfunction of the converter assembly, said evaluation device being embodied as a control device for the first actuator and connected to the first actuator for control purposes.

9. The converter arrangement of claim 1, wherein the first actuator is embodied as an electrical, a hydraulic or a pneumatic actuator.

10. The converter arrangement of claim 1, further comprising a second electrical network including lines arranged on the basic structure; and a plurality of second contacts arranged on the basic structure, said second contacts movable via a second actuator from a second connection position into a second release position, said converter assembly securable in the second release position as a unit in a fixed location in the receptacle of the basic structure and removable from the receptacle, said converter assembly being electrically connected to the lines of the second electrical network when the second contacts assume the second connection position and electrically disconnected from the lines of the second network when the second contacts assume the second release position, wherein the receptacle is immobile when the second contacts move from the second connection position into the second release position.

11. The converter arrangement of claim 10, further comprising a control device for jointly activating the first actuator and the second actuator or the first actuator and the second actuator are identical to one another.

12. The converter arrangement of claim 10, wherein the second electrical network is a multi-phase alternating current network.

13. A vehicle, comprising:
a converter arrangement including a basic structure having a receptacle, a first electrical network including lines arranged on the basic structure, a plurality of first contacts arranged on the basic structure and movable via a first actuator from a first connection position into a first release position, and a converter assembly securable in the first release position as a unit in a fixed location in the receptacle of the basic structure and removable from the receptacle, said converter assembly being electrically connected to the lines of the first electrical network when the first contacts assume the first connection position, and electrically disconnected from the lines of the first network when the first contacts assume the first release position, wherein the receptacle of the basic structure is immobile when the first contacts move from the first connection position into the first release position;
a second electrical network; and
a traction drive connected to the converter arrangement via the second electrical network.

14. The vehicle of claim 13, wherein the first network is a DC voltage network, said DC voltage network including a voltage stabilizing capacitor arranged in a fixed location on the basic structure.

15. The vehicle of claim 13, wherein the converter arrangement includes flexible lines connecting the first contacts to the lines of the first network.

16. The vehicle of claim 15, wherein the flexible lines are embodied as strip lines which, when viewed from the lines of the first network to the first contacts, have a length, a width in cross-section, a thickness, and are spaced from one another at a distance.

17. The vehicle of claim 16, wherein the width of the flexible lines is significantly greater than the distance of the flexible lines from one another.

18. The vehicle of claim 13, wherein the first contacts are embodied as contact bridges, said contact bridges being electrically connected both to the converter assembly and to the lines of the first network in the first connection position, and electrically disconnected from the converter assembly and from the lines of the first network in the first release position.

19. The vehicle of claim 13, wherein the first contacts are embodied as plugs or receptacles for plugs of plug-in electrical connections.

20. The vehicle of claim 13, wherein the converter arrangement includes an evaluation device configured to automatically detect a malfunction of the converter assembly, said evaluation device being embodied as a control device for the first actuator and connected to the first actuator for control purposes.

21. The vehicle of claim 13, wherein the first actuator is embodied as an electrical, a hydraulic or a pneumatic actuator.

22. The vehicle of claim 13, wherein the second electrical network includes lines arranged on the basic structure, and a plurality of second contacts arranged on the basic structure, said second contacts movable via a second actuator from a second connection position into a second release position, said converter assembly securable in the second release position as a unit in a fixed location in the receptacle of the basic structure and removable from the receptacle, said converter assembly being electrically connected to the lines of the second electrical network when the second contacts assume the second connection position and electrically disconnected from the lines of the second network when the second contacts assume the second release position, wherein the receptacle is immobile when the second contacts move from the second connection position into the second release position.

23. The vehicle of claim 22, wherein the converter arrangement includes a control device for jointly activating the first actuator and the second actuator or the first actuator and the second actuator are identical to one another.

24. The vehicle of claim 13, wherein the second electrical network is a multi-phase alternating current network.

* * * * *